(12) United States Patent
House et al.

(10) Patent No.: US 6,658,850 B1
(45) Date of Patent: Dec. 9, 2003

(54) RADIO FREQUENCY COMMUNICATIONS NETWORK FOR POWER PLANT CONTROL SYSTEMS

(75) Inventors: Michael B. House, Clifton Park, NY (US); Andrew J. Travaly, Ballston Spa, NY (US); Anthony S. Arrao, Clifton Park, NY (US); Harold W. Tomlinson, Jr., Scotia, NY (US); Daniel W. Sexton, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/065,634

(22) Filed: Nov. 5, 2002

(51) Int. Cl.⁷ ............................. F01K 13/02; F01B 21/00
(52) U.S. Cl. ............................................. 60/646; 60/657
(58) Field of Search .................................... 60/646, 657

(56) References Cited

U.S. PATENT DOCUMENTS

| 6,230,496 B1 | * | 5/2001 | Hofmann et al. | ............. | 60/698 |
| 6,529,849 B2 | * | 3/2003 | Umezawa et al. | ............. | 60/646 |
| 2002/0134083 A1 | * | 9/2002 | Staphanos et al. | ............. | 60/698 |

FOREIGN PATENT DOCUMENTS

| GB | 2 217 951 | 11/1989 |
| JP | 2-188602 | 7/1990 |
| JP | 11-110007 | 4/1999 |
| WO | WO 90/05563 | 5/1990 |
| WO | WO 00/29917 | 5/2000 |
| WO | WO 01/15384 | 3/2001 |

OTHER PUBLICATIONS

Profibus Brochure, Order No. 4.002. "Profibus Technical Description", Sep. 1999, pp. 1–33.
GE Fanuc Products, Genius, "Genius I/O", pp. 1—2, http://www.genfanuceurope.com/3/32/genius/Genius I O.asp.

* cited by examiner

*Primary Examiner*—Sheldon J. Richter
(74) *Attorney, Agent, or Firm*—Nixon & Vanderhye P.C.

(57) ABSTRACT

A system and method for establishing communications in a power plant comprises a power generation system having an interface for establishing wireless communication, at least one power plant auxiliary system having an interface for enabling wireless communication, and a wireless communications link, having at least two redundant wireless communications channels, established between the power generation system and the power plant auxiliary system. The two redundant wireless communications channels may be two redundant wireless radio frequency channels. The communications link may be established utilizing a network communications controller which wirelessly communicates with the power generation system and the power plant auxiliary system. One or more of the power plant auxiliary systems may communicate with the network communications controller through a repeater.

18 Claims, 4 Drawing Sheets

Fig.1

Fig.5

RADIO FREQUENCY COMMUNICATIONS NETWORK FOR POWER PLANT CONTROL SYSTEMS

BACKGROUND OF THE INVENTION

This invention relates to a wireless radio frequency (rf) communications network for controlling a power plant, and more particularly to a system and method for establishing a wireless rf communications network for communicating multiply (e.g., doubly or triply) modular redundant wireless signals over a plurality of respective communications channels for monitoring and controlling operations in a power plant.

A conventional power plant comprises, a power generation system having components such as a turbine and a power generator, and various auxiliary systems (e.g., support skids such as a lubrication oil skid, a water wash skid, etc.). These various systems in the power plant are often interconnected by analog (wired) networks. This analog wiring has been conventionally used to interconnect systems in the power plant to insure equipment safety and reliability even under severe environmental conditions. However, installing these wired interconnections is both time consuming and labor intensive. For example, many wires are often connected to each of the many measuring devices (e.g., sensors, transducers, and thermocouples) of the power plant in a star configuration. Difficulties therefore arise during electrical loop inspections if a wire is misplaced or misconnected.

In addition to the labor intensive and time consuming installation, the material costs for the wiring (e.g., copper cabling) are quite significant. It would therefore be beneficial to substitute this wire-based configuration with a digital, wireless field bus to expedite the installation of the components of the power plant and to minimize material costs.

As noted above, wiring has been used by manufacturers of power plants to insure equipment safety and reliability. Processing facilities have implemented digital input/output (I/O) using field bus architectures such as Profibus™ and Genius™. These field bus architectures allow for remote changes to be made and implemented if control system operating requirements are changed.

Wireless networks have been widely used in general in the 900 MHz and 2.4 GHz regions. However, these wireless networks typically have been incapable of operating reliably in a noisy electromagnetic environment. There thus remains a need for a wireless communication system for controlling operation in a power plant which allows for easy and less costly installation, but that also operates reliably after installation even under severe environmental conditions such as wide temperature variations and noisy electromagnetic environments.

BRIEF DESCRIPTION OF THE INVENTION

In one exemplary embodiment of the invention, a system and method comprises a power generation system having an interface for enabling wireless communication, at least one power plant auxiliary system having an interface for enabling wireless communication, and a wireless communications link having at least two redundant wireless communications channels established between the power generation system and the power plant auxiliary system.

The two redundant wireless communications channels may be two redundant wireless radio frequency channels. The communications link may be established utilizing a network communications controller which wirelessly communicates with the interface of the power generation system and wirelessly communicates with the interface of the power plant auxiliary system through a repeater. The repeater may wirelessly and separately communicate with a plurality of interfaces of a plurality of respective separate power plant auxiliary systems, each respective communications link established between the separate power plant auxiliary systems and the power generation system having at least two redundant wireless channels.

In another exemplary embodiment of the invention, a power generation system comprises a power generator, and a turbine coupled to the power generator. At east one of the power generator, and turbine includes an interface for remotely and simultaneously transmitting or receiving at least two redundant wireless signals having different respective frequencies over a wireless communications link. The two redundant wireless signals may be radio frequency signals having different frequencies which are remotely transmitted to or received from a network communications controller. The two redundant wireless signals may relate to communications with at least one power plant auxiliary system.

In another exemplary embodiment of the invention, a power plant auxiliary system comprises a controller for controlling a parameter of the power plant auxiliary system, and an interface, operatively connected to the controller, for remotely and simultaneously transmitting or receiving at least two redundant wireless signals having different respective frequencies over a wireless communications link. The two redundant wireless signals may be radio frequency signals having different frequencies and may be remotely communicated to/from a network communications controller. The two redundant wireless signals may relate to communications with at least one component of a power generation system.

DETAILED DESCRIPTION OF THE INVENTION

Figure 1:
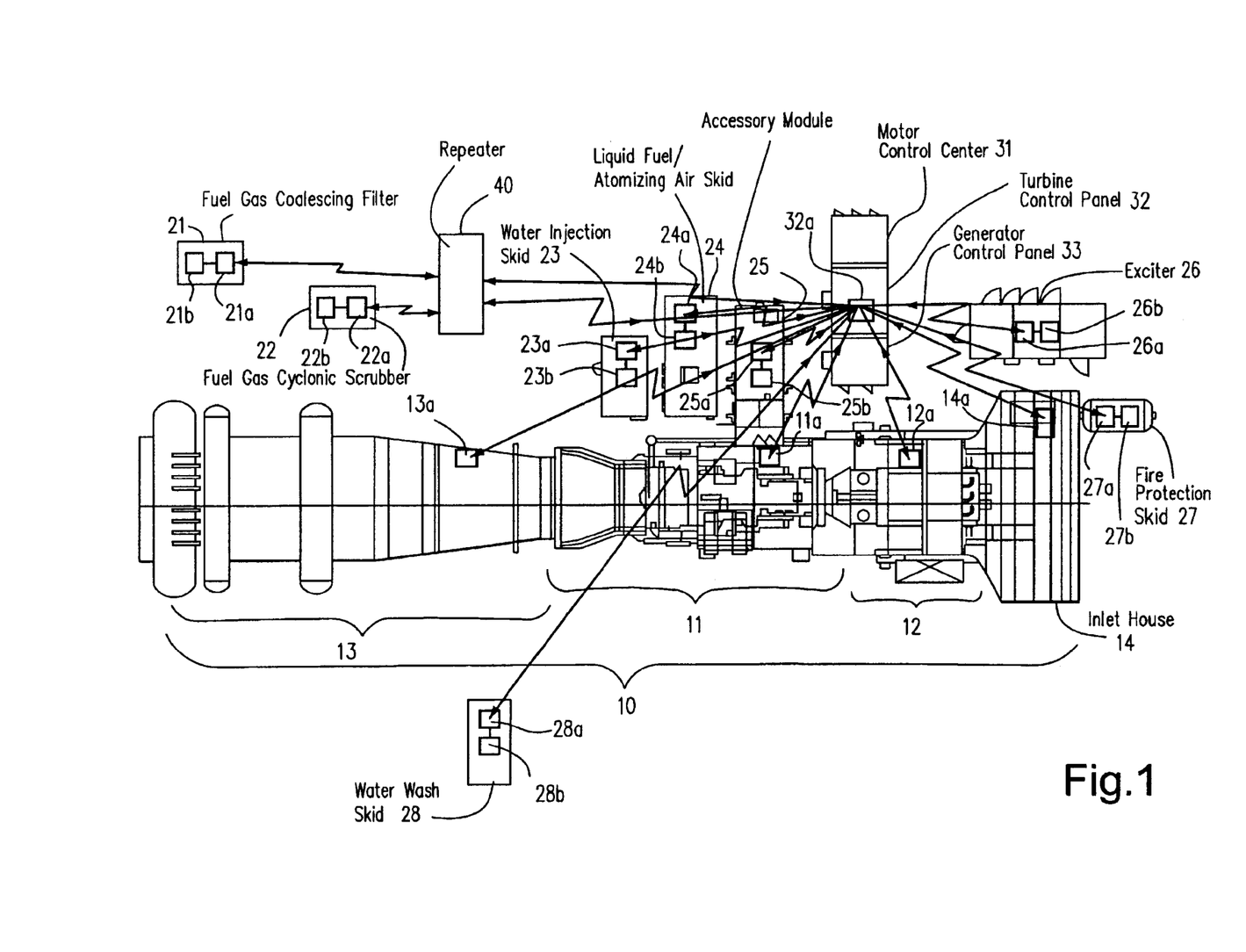
FIG. 1 is a diagram illustrating power plant equipment such as a simple cycle power generation system and various power plant auxiliary systems in accordance with an exemplary embodiment of the present invention.

FIG. 1 illustrates components of a power plant in accordance with an exemplary embodiment of the present invention. The components of the power plant include a simple cycle power generation system 10. Power generation system 10 includes turbine 11, power generator 12, turbine exhaust passage 13 and gas inlet housing 14. Turbine 11 drives power generator 12 using air provided through inlet housing 14 to produce electric power. Exhaust gas from turbine 11 is expelled through turbine exhaust passage 13. While turbine 11 of FIG. 1 is illustrated as a gas turbine, other types of turbines such as a steam turbine may be substituted in its place for driving generator 12.

Additional components of the power plant include various power plant auxiliary systems such as the following: fuel gas coalescing filter 21, fuel gas cyclonic scrubber 22, water injection skid 23, liquid fuel/atomizing air skid 24, accessory module 25, exciter 26, fire protection skid 27 and water wash skid 28. Each of these power plant auxiliary systems performs a function to maintain optimum performance of the power plant. For example, water wash skid 28 may be used to clean turbine 11, exciter 26 initiates operation of turbine 11, and fuel gas coalescing filter 21 removes particles in the fuel. Each of the power plant auxiliary systems 21–28 includes controllers 21b–28b, respectively, for monitoring and controlling operation of the systems. Each of these controllers 21b–28b, for example, receives and processes inputs reflecting a measured parameter from various measuring devices such as sensors, transducers and/or thermocouples in that particular auxiliary system for monitoring and controlling the operation thereof.

Each of the power plant auxiliary systems 21–28 also includes modular interfaces 21a–28a which are respectively connected to the controllers 21b–28b of the auxiliary systems 21–28 for communicating (i.e., transmitting and/or receiving) wireless radio frequency signals. Measurements from a sensor of auxiliary system 21 provided to controller 21b may for example be processed and forwarded to interface 21a for wireless transmission of signals reflecting those measurements. Turbine 11, generator 12, exhaust passage 13 and inlet housing 14 of power generation system 10 respectively include interfaces 11a–14a for wireless communication.

The power plant further includes motor control center 31, turbine control panel 32 and generator control panel 33 for wirelessly receiving, processing and transmitting information from components (e.g., turbine 11, generator 12, exhaust passage 13 and inlet housing 14) of power generation system 10 and one or more of power plant auxiliary systems 21–28. Accordingly, wireless monitoring and control of the power plant may be established through motor control center 31, turbine control panel 32 and generator control panel 33. In particular, turbine control panel 32 includes a network communications controller 32a which communicates digital information with interfaces 21a–28a of auxiliary systems 21–28 and interfaces 11a–14a of power generation system 10. Respective wireless communications links are established between components of power generation system 10 and each of power plant auxiliary systems 21–28 for communicating information wirelessly therebetween.

In accordance with an exemplary embodiment of the present invention, each of the respective wireless communications links (illustrated by the lines having bidirectional arrowheads in FIG. 1) established between components of the power generation system 10 and each of the power plant auxiliary systems 21–28 requires two or more redundant wireless communications channels. Each of these channels communicates information utilizing different frequencies. For example, a wireless communications link which provides triple modular redundancy may simultaneously communicate information on a 2.4 GHz channel, a 5.0 GHz channel and a 60 GHz channel.

A description of communication between one of the power plant auxiliary systems 28 and the power generation system 10 over a multiply redundant wireless communications link is described below. Communication over other multiply redundant wireless communications links between the other power plant auxiliary systems 21–27 and components of the power generation system 10 is provided in a similar manner.

Data received from measuring devices such as sensor(s), transducer(s) and/or thermocouple(s) of water wash skid 28 is provided to and processed by controller 28b. This information processed by controller 28b may then be provided to modular interface 28a for multiply redundant wireless transmission over a communications link to network communications controller 32a. That is, redundant information may be simultaneously transmitted on two or more frequencies over a first stage of the wireless communications link to network communications controller 32a. Network communications controller 32a processes the received signals and transmits in turn information to one of the interfaces 11a–14a of the power generation system 10 over at least two redundant wireless communications channels in a second stage of the communications link. Accordingly, information originating from a measuring device of water wash skid 28 is wirelessly communicated to one or more components of power generation system 10 over a wireless communications link which has two or more redundant wireless communications channels.

Communications links established between a respective power plant auxiliary system 21–28 and the components of the power generation system 10 are bi-directional. Accordingly, not only can information be wirelessly transmitted from each of the auxiliary systems 21–28 over the communications link in a multiply redundant fashion to power generation system 10 as discussed above, but power generation system 10 can likewise transmit information to the auxiliary systems 21–28 over the respective multiply redundant wireless communications links. For example, redundant information from turbine 11 may be simultaneously transmitted on two or more radio frequency communications channels via interface 11a to network communications controller 32a in a first stage of a communications link. Network communications controller 32a processes the signals received from interface 11a, and then wirelessly transmits multiply redundant signals during a second stage of the communications link to water wash skid 28. In particular, the redundant information transmitted on two or more frequencies of the wireless communications link is received by interface 28a of water wash skid 28 and then forwarded to controller 28b for processing.

Network communications controller 32a thus serves as an intermediate node for establishing the respective wireless communications links between each of the components of the power generation system 10 and each one of the power plant auxiliary system 21–28. Network communications controller 32a receives redundant transmitted on different frequency channels during a first stage of the communications link, processes this information, and then transmits redundant information on different frequency channels in a second stage of the communications link. By processing information received from any of the auxiliary systems 21–28 or one of the components (e.g., turbine 11, generator 12, exhaust passage 13 and gas inlet housing 14) of the power generation system 10 in a first stage of the communications link, network communications controller 32a may determine the appropriate redundant signals to be transmitted during the second stage. For example, if network communications controller 32a received three signals on three respective channels of a triply redundant wireless communication link, network communications controller 32a may perform a voting procedure to determine the appropriate signal level to be transmitted during the second stage of the communications link. As an example, suppose two out of the three redundant signals received by network communications controller 32a are at a high level while the remaining signal is at a low level. Network communications controller 32a would then determine, using a voting procedure, that the high signal level is the correct one (even though one of the channels of the triply redundant wireless communications link is at a different level). This high signal level would then be simultaneously transmitted on each of the three channels forming the second stage of the communications link.

Figure 2:
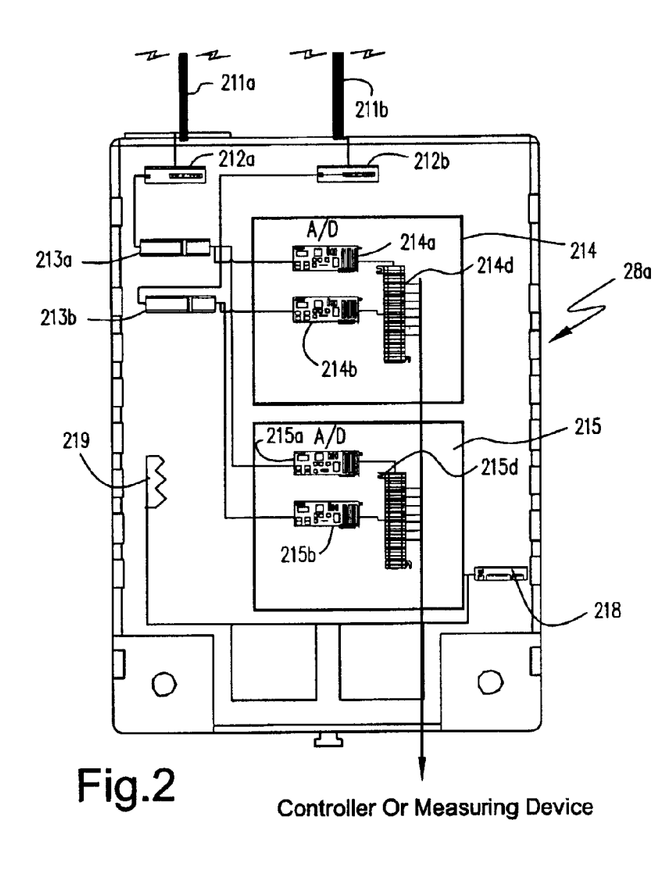
FIG. 2 is a diagram of an exemplary communications interface circuit which is capable of transmitting and/or receiving doubly redundant wireless signals and may be utilized in the power plant equipment illustrated in FIG. 1.

FIG. 2 illustrates the components of an exemplary embodiment of an interface 28a for transmitting and receiving doubly redundant wireless signals over a communications link having two different radio frequency channels. While FIG. 2 illustrates interface 28a, it will be understood that interfaces 21a–27a of auxiliary systems 21–27, respectively, and interfaces 11a–14a of power generation system 10 have a similar construction to enable doubly redundant wireless communication over respective communications links. The interfaces 21a–28a and 11a–14a are thus modular interfaces.

Interface 28a includes antennas 211a and 211b, RF radios 212a and 212b, switches 213a and 213b, analog to digital (A/D) converters 214 and 215, power supply 218 and resistive heater 219. A/D converter 214 includes integrated circuits (ICs) 214a and 214b and terminal strip 214d, and A/D converter 215 includes integrated circuits (ICs) 215a and 215b and terminal strip 215d.

Antennas 211a and 211b are capable of simultaneously transmitting or receiving RF signals having different frequencies. For example, antenna 211a may be tuned via RF radio 212a to receive and/or transmit signals at a frequency of 2.4 GHz and antenna 211b may be tuned via RF radio 212b simultaneously receive and/or transmit signals at a frequency of 5.0 GHz.

Each of the A/D converters 214, 215 is operatively coupled through controller 28b (or directly) to a respective sensor, transducer or thermocouple of the auxiliary system (in this case water wash skid 28). A/D converter 214 may therefore provide or receive signals from one sensor, transducer or thermocouple while A/D converter 215 provides or receives signals from another sensor, transducer or thermocouple. Interface 28a may handle input and output signals that are received and transmitted at different rates.

In operation, an analog signal may be provided by a sensor, transducer or thermocouple connected to A/D converter 214 through controller 28b and the converter's terminal strip 214d. Alternatively, the analog signal may be provided directly from the sensor, transducer, or thermocouple to A/C converter 214 through its terminal strip 214d. The signal received by A/D converter 214 is duplicated and provided to integrated circuits 214a and 214b for conversion. The outputs from integrated circuits 214a and 214b are digital signals which are provided to switches 213a and 213b, respectively. Switches 213a and 213b in turn provide signals to RF radios 212a and 212b. RF radios 212a and 212b enable redundant (duplicate) signals to be simultaneously transmitted from antennas 211a and 211b, respectively, on two different radio frequency channels of the communications link.

Similar to the operation discussed above with respect to A/D converter 214, A/D converter 215 is capable of receiving a signal originating from another (different than the one connected to A/D converter 214) sensor, transducer or thermocouple through terminal strip 215d directly or via controller 28b. The received analog signals are duplicated and provided to integrated circuits 215a and 215b for conversion. The digital outputs of these two integrated circuits 215a and 215b are provided to switches 213a and 213b, respectively. Switches 213a and 213b provide corresponding signals at the appropriate time to RF radio 212a and 212b, respectively simultaneously transmit redundant signals at two different frequencies over the communications link through antennas 211a and 211b, respectively.

In addition to simultaneously transmitting redundant wireless signals at two different frequencies, interface 28a is capable of simultaneously receiving redundant wireless signals transmitted over the communications link at two different RF frequencies. For example, a digital signal received by antenna 211a may be provided by RF radio 212a to switch 213a. Switch 213a may then provide the digital signal to one or more of the A/D converters 214 and 215 (ICs 214a, 215a in particular) as appropriate. The A/D converter 214 and/or 215 will convert the received digital signal to analog form and provide this analog signal to its associated sensor, transducer, or thermocouple either directly or through controller 28b. Similarly, a digital signal received by antenna 211b may be provided by RF radio 212b switch 213b. Switch 213b may then provide the digital signal to one or more of the A/D converters 214 and 215 (ICs 214b, 215b in particular). The A/D converters 214 and/or 215 converts the signal to analog form and provides this analog signal to the appropriate sensor, transducer, or thermocouple either directly or through controller 28b.

Resistive heater 219 is connected to power supply 218 and may be used to keep the components of interface 28a at a desired temperature or within a desired temperature range. The operation of resistive heater 219 may be particularly beneficial if the auxiliary system 28 is exposed to harsh environmental conditions such as an environment having a cold temperature. The components of interface 28a may be enclosed by a NEMA 4/4x housing.

Figure 3:
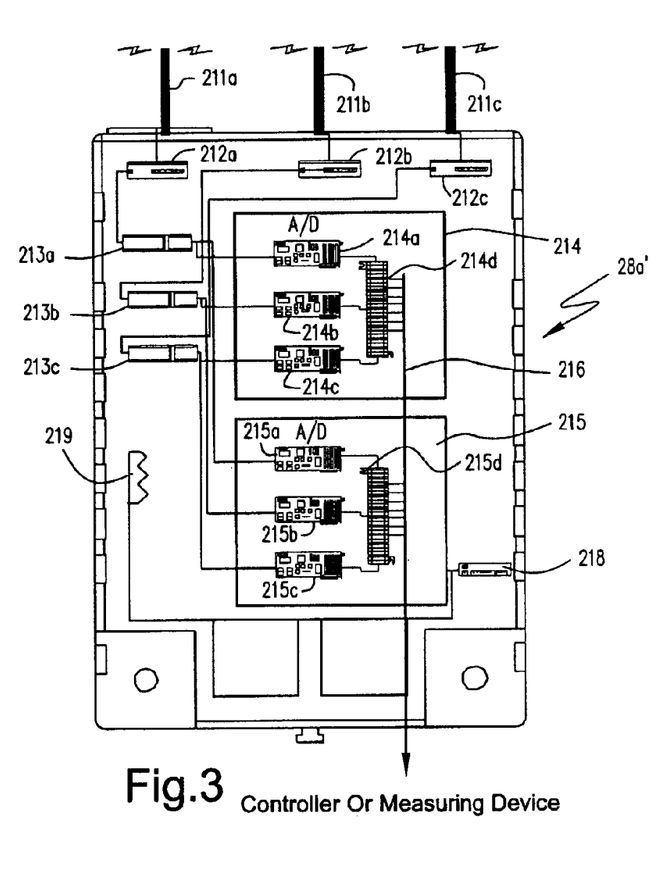
FIG. 3 is a diagram of an alternative exemplary communications interface circuit which is capable of transmitting and/or receiving triply redundant wireless signals and may be utilized in the power plant equipment illustrated in FIG. 1.

FIG. 3 illustrates an alternative embodiment of an exemplary interface 28a", although it will be appreciated that a modular interface having identical or similar construction as that of interface 28a" may be used for any of the interfaces 21a–27a or 11a–14a. Reference numerals corresponding to parts discussed in the previous exemplary embodiments shall remain the same and only the differences from previous exemplary embodiments will be discussed in detail.

While the interface 28a illustrated in FIG. 2 simultaneously transmits and receives doubly redundant wireless radio frequency signals, the interface 28a" illustrated in FIG. 3 is capable of simultaneously transmitting or receiving triply redundant wireless signals on three different radio frequency channels of a communications link. Specifically, interface 28a" includes an additional (with respect to interface 28a illustrated in FIG. 2) antenna 211c, RF radio 212c and switch 213c for transmitting or receiving wireless radio frequency signals at a frequency which is different than those transmitted or received by antennas 211a and 211b. For example, antennas 211a, 211b and 211c may simultaneously transmit or receive redundant wireless signals at frequencies of 2.4 GHz, 5.0 GHz and 60 GHz, respectively.

The wireless signal received or transmitted by antenna 211c may be communicated to/from a sensor, transducer, or thermocouple directly or through controller 28b via RF radio 212c and switch 213c in a manner to similar to that discussed above for the signals communicated to/from antennas 211a and 211b.

By enabling a plurality of respective wireless bi-directional communications links for communicating multiply redundant RF signals between a plurality of power plant auxiliary systems 21–28 and components of power generation system 10, the time and labor involved with installing a communications system for providing monitoring and control of the power plant can be minimized since the need for end-to-end wiring can be minimized. The wireless connections are capable of accommodating multiple rate input/output (I/O), have sufficient range from transmitter to receiver and can be self-synchronizing after failure, although it will be understood that wires can be used to connect auxiliary systems 21–28 and power generation system 10 to form yet another redundant mechanism for communicating signals in the power plant. Significant savings in terms of material costs may also be achieved. Since each of the communications links between a auxiliary system 21–28 and components of the power generation system 10 includes multiple redundant channels, a high degree of reliability for communications within the power plant may be achieved even in harsh environments. As another alternative exemplary embodiment, one or more of the auxiliary systems 21–28 may communicate to one or more of components of power generation system 10 via a wired communications link while the remaining auxiliary components 21–28 communicate to the components of power generation system 10 through redundant wireless communications links having a plurality of channels as discussed above. For example, auxiliary systems 21 and 22 may be connected to auxiliary systems 23–28 are connected to the components of power generation system 10 through respective redundant wireless communications links each having multiple channels.

Figure 4:
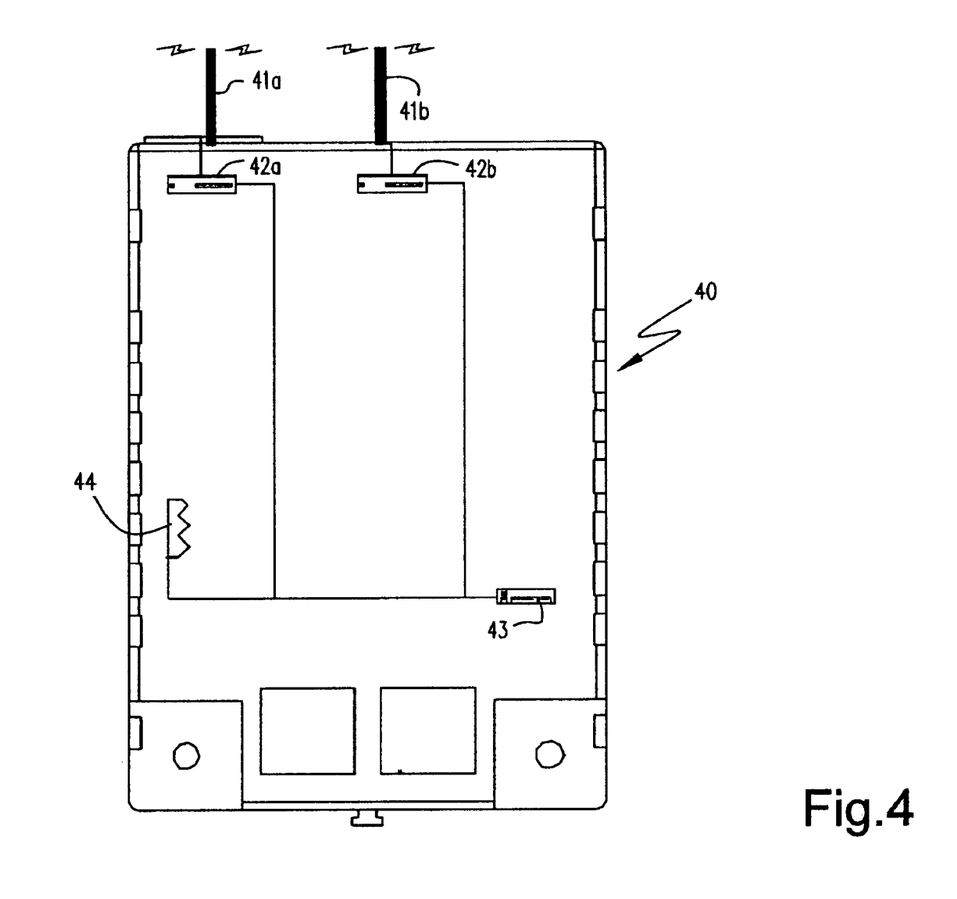
FIG. 4 is a diagram of an exemplary repeater which may be utilized for communicating multiply redundant wireless signals between the power generation system and one or more power plant auxiliary systems.

Referring now to FIGS. 1 and 4, one or more of the power plant auxiliary systems (e.g., fuel gas coalescent filter 21 and fuel gas cyclonic scrubber 22 illustrated in FIG. 1) may simultaneously communicate multiply redundant radio frequency signals with network communications controller 32a through repeater 40. Repeater 40 essentially receives and rebroadcasts multiply redundant signals communicated between one or more of the power plant auxiliary systems (e.g., filter 21 and scrubber 22) and network communications controller 32a. Repeater 40 may also amplify signals if needed and is particularly beneficial when the location of the power plant auxiliary system 21, 22 has a distant location away from the network communications controller 32a.

FIG. 4 provides a detailed illustration of an exemplary repeater for simultaneously receiving and rebroadcasting doubly redundant radio frequency signals in the present invention. In particular, repeater 40 includes antennas 41a and 41b respectively connected to RF radios 42a and 42b. Repeater 40 also includes power supply 43 and resistive heater 44. Antenna 41a and RF radio 42a enable receipt and retransmission of a digital wireless signal at a first radio frequency (e.g., 2.4 GHz) while antenna 41b and RF radio 42b enable receipt and retransmission of a redundant digital signal being transmitted at a different radio frequency (e.g., 5.0 GHz). Resistive heater 44 allows the repeater 40 to be maintained at a desired temperature or within a desired temperature range. Power supply 43 provides power to resistive heater 44 and RF radios 42a and 42b.

Repeater 40 illustrated in FIG. 4 for simultaneously receiving and retransmitting doubly redundant radio frequency signals may be modified by adding an additional antenna and RF radio to receive and retransmit another redundant wireless signal at a different radio frequency (e.g., 60 GHz). Accordingly, repeater 40 illustrated in FIG. 4 may be modified so that it includes three antennas and three RF radios respectively connected thereto in order to wirelessly receive and transmit triply redundant radio frequency signals over a communication link.

Figure 5:
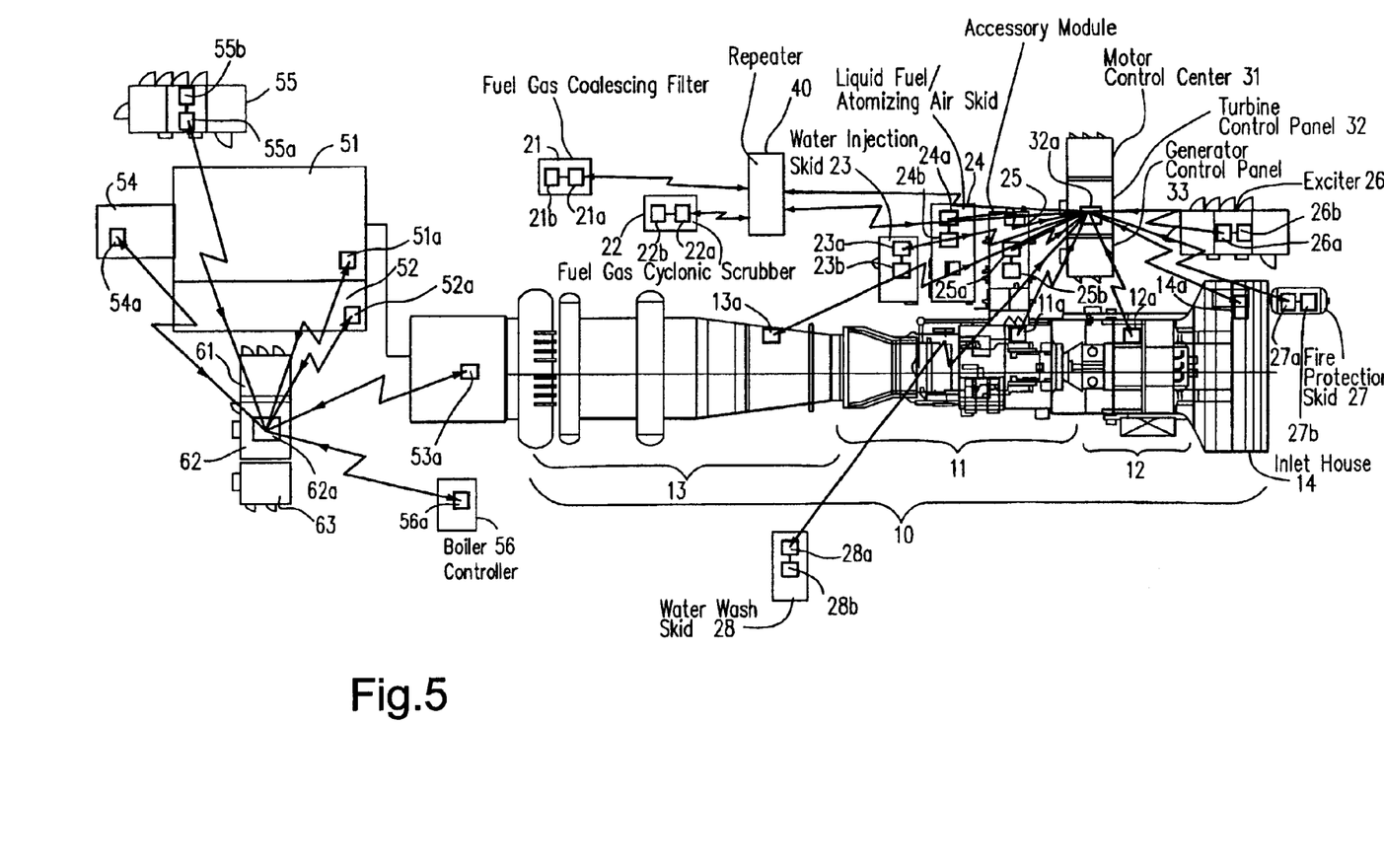
FIG. 5 is a diagram illustrating power plant equipment such as a combined cycle power generation system and various power plant auxiliary systems in accordance with an alternative exemplary embodiment of the present invention.

FIG. 5 illustrates an alternative exemplary embodiment of the present invention in which the power plant includes a combined cycle power generation system. The reference numerals corresponding to parts discussed in previous embodiments will be maintained with only the differences from the previous embodiments being discussed in detail.

The combined cycle power generation system includes the components of the simple cycle power generation system illustrated in FIG. 1, and in addition, further includes a second generator 54, a steam turbine 51, a condenser 52 and a heat recovery/steam generator 53. In addition to power plant auxiliary systems 21–28, the alternative embodiment illustrated in FIG. 5 further includes the following auxiliary systems: an exciter 55 and boiler controller 56. While power plant auxiliary systems 21–28a communicate with turbine 11, generator 12, turbine exhaust passage 13 and/or inlet house 14, auxiliary systems 55 and 56 are each capable of simultaneously communicating multiple redundant RF signals over respective communication links with steam turbine 51, condenser 52, heat recovery/steam generator 53 and/or generator 54. In particular, exciter 55 includes controller 55b and interface 55a and boiler controller 56 includes interface 56a for wirelessly communicating with one or more of the steam turbine 51, condenser 52, heat recovery/steam generator 53 and generator 54. For example, a wireless communication link having multiply redundant RF channels is established between controller 55b of exciter 55 and generator 54 via interfaces 55a and 54a. Similarly, controller 55b communicates with steam turbine 51, condenser 52 and heat recovery/steam generator 53 through respective wireless communications links, each having multiply redundant RF channels. Other respective communications links, each having multiply redundant RF channels, are similarly established between boiler controller 56 (via interface 56a) and one or more of steam turbine 51 (via interface 51a), condenser 52 (via interface 52a), heat recovery/steam generator 53 (via interface 53a) and generator 54 (via interface 54a).

Motor control sensor 61, steam turbine controller 62 and generator control panel 63 monitor and control the operation of the steam turbine 51, condenser 52, steam generator 53 and generator 54. Steam turbine controller 62 includes a network controller 62a which enables respective communications links to be established between boiler controller 56 and one or more of steam turbine 51, condenser 52, heat recovery/steam generator 53 and generator 54 through their respective interfaces 51a–54a. Similarly, respective communications links between exciter 55 and steam turbine 51, condenser 52, heat recovery/steam generator 53 and generator 54 are established through network communications controller 62a serving as an intermediate node.

Network communications controller 62a operates in a similar fashion as network communications controller 32a. For example, information processed by controller 55b may be transmitted from interface 55a to network communications controller 62a over a first stage of a multiply redundant wireless communications link. After processing the received signals, network communications controller 62a transmits redundant wireless signals over the second stage of the communications link to, for example, interface 51 a of steam turbine 51. Steam turbine 51 may also transmit information through its interface 51 a over a first stage of the communications link having multiple redundant RF channels to network communications controller 62a. Network communications controller 62a processes these received signals and transmits the signals over the second leg of the wireless communication link to interface 55a of exciter 55. Similar communications are enabled through respective communications links between each of the additional power plant auxiliary systems (boiler controller 56 and exciter 55) and one or more of the additional components of the combined cycle power generation system (e.g., turbine 51, condenser 52, heat recovery/steam generator 53 and/or generator 54).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of providing communication in a power plant, the method comprising:

providing a power generation system having an interface enabling wireless communication;

providing at least one power plant auxiliary system having an interface for enabling wireless communication; and establishing a wireless communications link between the power generation system and the power plant auxiliary system, the wireless communications link having at least two redundant wireless communications channels.

2. The method of claim 1 wherein the at least two redundant wireless communications channels are at least two redundant radio frequency channels.

3. The method of claim 1 wherein the communications link is established utilizing a network communications controller which wirelessly communicates with the interface of the power generation system and wirelessly communicates with the interface of the power plant auxiliary system.

4. The method of claim 3 wherein the communications network controller wirelessly communicates with the interface of the power plant auxiliary system through a repeater which wirelessly communicates with the network communications controller and wirelessly communicates with the interface of the power plant auxiliary system.

5. The method of claim 4 wherein the repeater wirelessly and separately communicates with a plurality of interfaces of a plurality of respective separate power plant auxiliary systems, each respective communications link between the separate power plant auxiliary systems and the power generation system having at least two redundant wireless channels.

6. A system comprising:

a power generation system having an interface for enabling wireless communication;

at least one power plant auxiliary system having an interface for enabling wireless communication; and a wireless communications link established between the power generation system and the power plant auxiliary system, the wireless communications link having at least two redundant wireless communications channels.

7. The system of claim 6 wherein the at least two redundant wireless communications channels are at least two redundant wireless radio frequency channels.

8. The system of claim 6 wherein the communications link is established utilizing a network communications controller which wirelessly communicates with the interface of the power generation system and wirelessly communicates with the interface of the power plant auxiliary system.

9. The system of claim 8 wherein the network communications controller wirelessly communicates with the interface of the power plant auxiliary system through a repeater which wirelessly communicates with the network communications controller and wirelessly communicates with the interface of the power plant auxiliary system.

10. The system of claim 9 wherein the repeater wirelessly and separately communicates with a plurality of interfaces of a plurality of respective separate power plant auxiliary systems, each respective communications link between the separate power plant auxiliary systems and the power generation system having at least two redundant wireless channels.

11. A power generation system comprising:

a power generator; and a turbine coupled to the power generator;

wherein at least one of the power generator and turbine includes an interface for remotely and simultaneously transmitting or receiving at least two redundant wireless signals having different respective frequencies over a wireless communication link.

12. The system of claim 11 wherein the at least two redundant wireless signals are radio frequency signals having different respective frequencies.

13. The system of claim 11 wherein the two redundant wireless signals are remotely transmitted to or received from a network communications controller.

14. The system of claim 11 wherein the two redundant wireless signals relate to communications with a power plant auxiliary system.

15. A power plant auxiliary system comprising:

a controller for controlling a parameter of the power plant auxiliary system; and an interface, operatively connected to the controller, for remotely and simultaneously transmitting or receiving at least two redundant wireless signals having different respective frequencies over a wireless communications link.

16. The power plant auxiliary system of claim 15 wherein the at least two redundant wireless signals are radio frequency signals having different frequencies.

17. The power plant auxiliary system of claim 15 wherein the two redundant wireless signals are remotely communicated to/from a network communications controller.

18. The power plant auxiliary system of claim 15 wherein the two redundant wireless signals relate to communications with at least one component of a power generation system.

* * * * *

UNITED STATES PATENT AND TRADEMARK OFFICE
CERTIFICATE OF CORRECTION

PATENT NO. : 6,658,850 B1
DATED : December 9, 2003
INVENTOR(S) : House et al.

It is certified that error appears in the above-identified patent and that said Letters Patent is hereby corrected as shown below:

<u>Title page,</u>
Item [56], should read as follows:

-- [56] References Cited
U.S. PATENT DOCUMENTS

| | | | |
|---|---|---|---|
| 4,767,276 | 8/1998 | Barnes et al. | 416/221 |
| 4,936,749 | 6/1990 | Arrao et al. | 416/500 |
| 5,581,869 | 12/1996 | Travaly | 29/596 |
| 5,682,467 | 10/1997 | Ambalavanar | 358/1.15 |
| 6,230,496 B1 | 5/2001 | Hofmann et al. | 60/698 |
| 6,236,334 | 5/2001 | Tapperson et al. | 340/825.37 |
| 6,396,025 | 5/2002 | Pyritz et al. | 219/121.63 |
| 6,529,849 B2 | 3/2003 | Umezawa et al. | 60/646 |
| 2002/0134083 A1 | 9/2002 | Staphanos et al. | 60/698 -- |

<u>Column 4,</u>
Line 59, insert -- information -- after "receives redundant".

<u>Column 6,</u>
Line 14, insert -- , which in turn -- after "and $212b$, respectively".
Line 30, insert -- to -- after "by RF radio $212b$".

<u>Column 7,</u>
Line 35, insert -- components of power generation system 10 through a wired connection while -- after "may be connected to".

UNITED STATES PATENT AND TRADEMARK OFFICE
CERTIFICATE OF CORRECTION

PATENT NO. : 6,658,850 B1
DATED : December 9, 2003
INVENTOR(S) : House et al.

It is certified that error appears in the above-identified patent and that said Letters Patent is hereby corrected as shown below:

Column 8,
Line 52, insert -- communications -- after "network".

Signed and Sealed this

Twenty-third Day of March, 2004

JON W. DUDAS
*Acting Director of the United States Patent and Trademark Office*